(12) United States Patent
Okutani

(10) Patent No.: US 7,418,384 B2
(45) Date of Patent: Aug. 26, 2008

(54) VOICE DATA INPUT DEVICE AND METHOD

(75) Inventor: Yasuo Okutani, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 10/690,028

(22) Filed: Oct. 20, 2003

(65) Prior Publication Data

US 2004/0093209 A1 May 13, 2004

(30) Foreign Application Priority Data

Oct. 22, 2002 (JP) ............................. 2002-307426

(51) Int. Cl.
*G10L 15/00* (2006.01)
(52) U.S. Cl. ...................... 704/251; 704/231
(58) Field of Classification Search ........................ None
See application file for complete search history.

(56) References Cited

U.S. PATENT DOCUMENTS 4,937,763 A * 6/1990 Mott .......................... 702/183
5,698,834 A * 12/1997 Worthington et al. .. 235/472.03
7,072,863 B1 * 7/2006 Phillips et al. ................. 703/2

FOREIGN PATENT DOCUMENTS

JP 2001-5484 1/2001
JP 13005484 * 12/2001

OTHER PUBLICATIONS

Gandhi et al. "Natural Number Recognition Using MCE Trained Inter-word Context Dependent Acoustice Models" IEEE ICASSP'98, Seattle, ISA, 1998.*
J. A. Bakker: A Semantic Framework for the Design of Data Distribution Schemes. DEXA Workshop 2000: pp. 653-660.*

* cited by examiner

*Primary Examiner*—David R. Hudspeth
*Assistant Examiner*—Josiah Hernandez
(74) *Attorney, Agent, or Firm*—Canon U.S.A. Inc., I.P. Division

(57) ABSTRACT

A data input device for inputting numeric data by voice includes a range prediction part, a history holding part, a speech recognition part, a recognition result holding part, a comparison part, a presentation part, and a result storing part. The range prediction part estimates a range of a value expected to be input on the basis of meter-reading history data held in the history holding part. The speech recognition part recognizes speech representing a meter reading and stores the recognition result in the recognition result holding part. The comparison part determines whether or not the meter reading for this month represented by the data stored in the recognition result holding part is within the prediction range. If the meter reading for this month is within the prediction range, the presentation part presents the recognition result to a user, and the speech recognition result is stored in the result storing part.

7 Claims, 7 Drawing Sheets

VOICE DATA INPUT DEVICE AND METHOD

BACKGROUND OF THE INVENTION

1. Field of the Invention

The present invention relates to a data input device and data input method for inputting numeric data by voice.

2. Description of the Related Art

Portable terminals (handy terminals) are becoming more commonly used for services, such as reading gas and electricity meters, inventory of products, and the like. The use of portable terminals allows information obtained on site to be input and processed in real time, thus increasing the efficiency and speed of such services. The size of portable terminals is being reduced because of the attention focused on the portability thereof, and data is generally input using soft keyboards or pens. In contrast, nowadays, speech recognition systems are attracting attention as alternative means for data input. Speech recognition is useful for situations where both hands of a user are occupied, and portable terminals with a speech recognition function have already been on the market.

In speech recognition, receivable words and recognition grammar are usually defined in advance. For example, in order to recognize three-digit numbers, procedures, such as registering each number from 0 to 999 as a word, preparing recognition grammar for receiving numbers from 0 to 9 for each digit, or the like, can be used. The number of receivable words and the complexity of the recognition grammar affect recognition performance. In other words, a reduction in the number of receivable words allows high accuracy of recognition results. With such a background, inventions have been made that are characterized in that the number of receivable words or recognition grammar can be reduced by setting words to be received (in this case, scaled numbers or the like) in advance by users.

For example, if a price range of products is from 100 yen to 1,000 yen and their prices are set in increments of 100 yen, the number of values to be received is 10, such as 100, 200, 300, etc. When known speech recognition grammar for receiving integers from 0 to 1,000 is used, even if only ten words are needed to be recognized, the recognition grammar can receive a thousand words. Thus, the possibility of misrecognition is increased. However, according to the above inventions (for example, Japanese Patent Laid-Open No. 2001-5484), the minimum value, the maximum value, the step width, and the like of a price range set by a user allow generation of recognition grammar by which the number of receivable words is reduced, thus suppressing a reduction in the recognition rate.

However, in such inventions, users need to set the minimum value, the maximum value, the step width, and the like for all items, such as a price and an amount, in advance.

SUMMARY OF THE INVENTION

A data input device according to the present invention inputs numeric data by voice and includes a holder operable to hold numeric data input in the past; a calculator operable to calculate a prediction range of a value expected to be input on the basis of the numeric data held in the holder; a speech recognizer operable to perform speech recognition of input speech representing a value; a determiner operable to determine whether or not a value represented by a recognition result obtained by the speech recognizer is within the prediction range calculated by the calculator; and a presenter operable to present details corresponding to the determined result.

Further objects, features and advantages of the present invention will become apparent from the following description of the preferred embodiments with reference to the attached drawings.

DESCRIPTION OF THE PREFERRED EMBODIMENTS

Although a data input device applied to a portable terminal according to preferred embodiments of the present invention will be described with reference to the drawings, the present invention is not limited to a portable terminal.

First Embodiment

Figure 1:
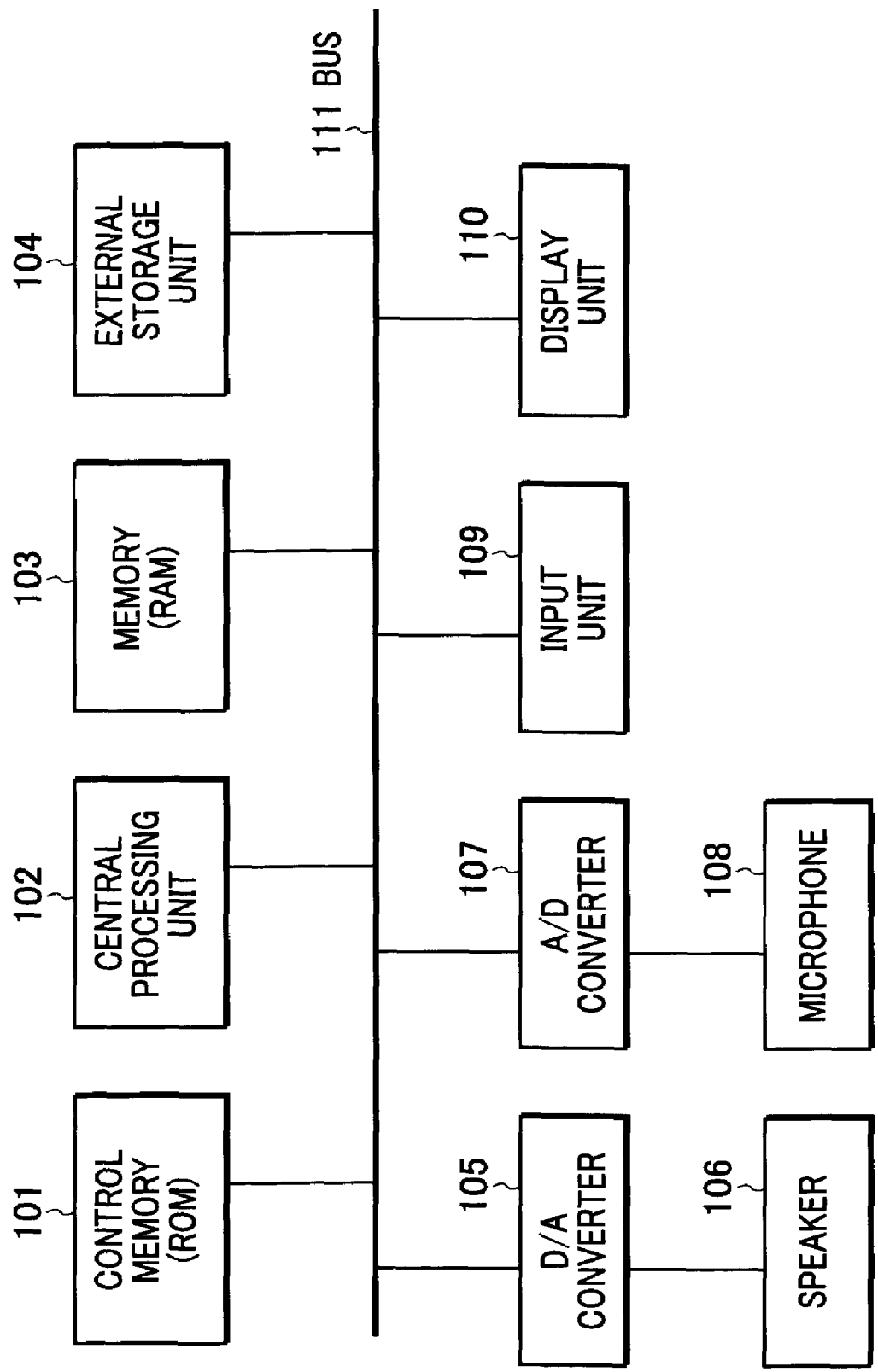
FIG. 1 is a block diagram of the basic structure of a data input device according to the present invention.

FIG. 1 is a block diagram of the basic structure of a data input device according to a first embodiment of the present invention. Although a case where a meter reading of gas, electricity, or the like is input to a portable terminal using voice will be described, the present invention is not limited to this, as long as a numeric value is input to a portable terminal using voice.

The data input device according to the first embodiment includes a control memory (ROM) 101, a central processing unit 102, a memory (RAM) 103, an external storage unit 104, a D/A converter 105, a speaker 106, an A/D converter 107, a microphone 108, an input unit 109, and a display unit 110. Each of the ROM 101, the central processing unit 102, the RAM 103, the external storage unit 104, the D/A converter 105, the A/D converter 107, the input unit 109, and the display unit 110 is connected to a bus 111, so that they can perform data communication with each other.

The ROM 101 stores a program (for example, a boot program), data (set data), and the like for controlling the entire data input device. The central processing unit 102 controls the data input device by using the program and the data stored in the ROM 101 and the RAM 103, and performs the various types of processing described below. The RAM 103 has an area for temporarily storing the program and data loaded from the external storage unit 104 to be used by the central processing unit 102 to perform various types of processing, and also has a work area for temporarily storing the data being processed for various types of processing performed by the central processing unit 102.

The external storage unit 104 is a mass storage unit such as a hard disc, and stores a program and various types of data, such as character data and voice data, to be executed by the central processing unit 102 to perform various types of processing described below. The D/A converter 105 has a function to convert a voice signal read on the RAM 103 from digital to analog and to output the converted voice signal as an analog signal to the speaker 106. The speaker 106 outputs the analog signal as voice.

The A/D converter 107 has a function to convert the voice signal, as an analog signal, input from the microphone 108 from analog to digital and to output the converted voice signal as a digital signal to the RAM 103. The input unit 109 includes a pointing device, such as a pen, a numerical keypad, or the like and is used for inputting various instructions to the central processing unit 102. The display unit 110 includes a CRT, liquid crystal display, or the like and displays various types of information, such as image information and character information. Here, the display unit 110 may include a touch panel. In this case, the input unit 109 may be eliminated. Alternatively, the input unit 109 may be a pen for inputting instructions on the touch panel.

Figure 2:
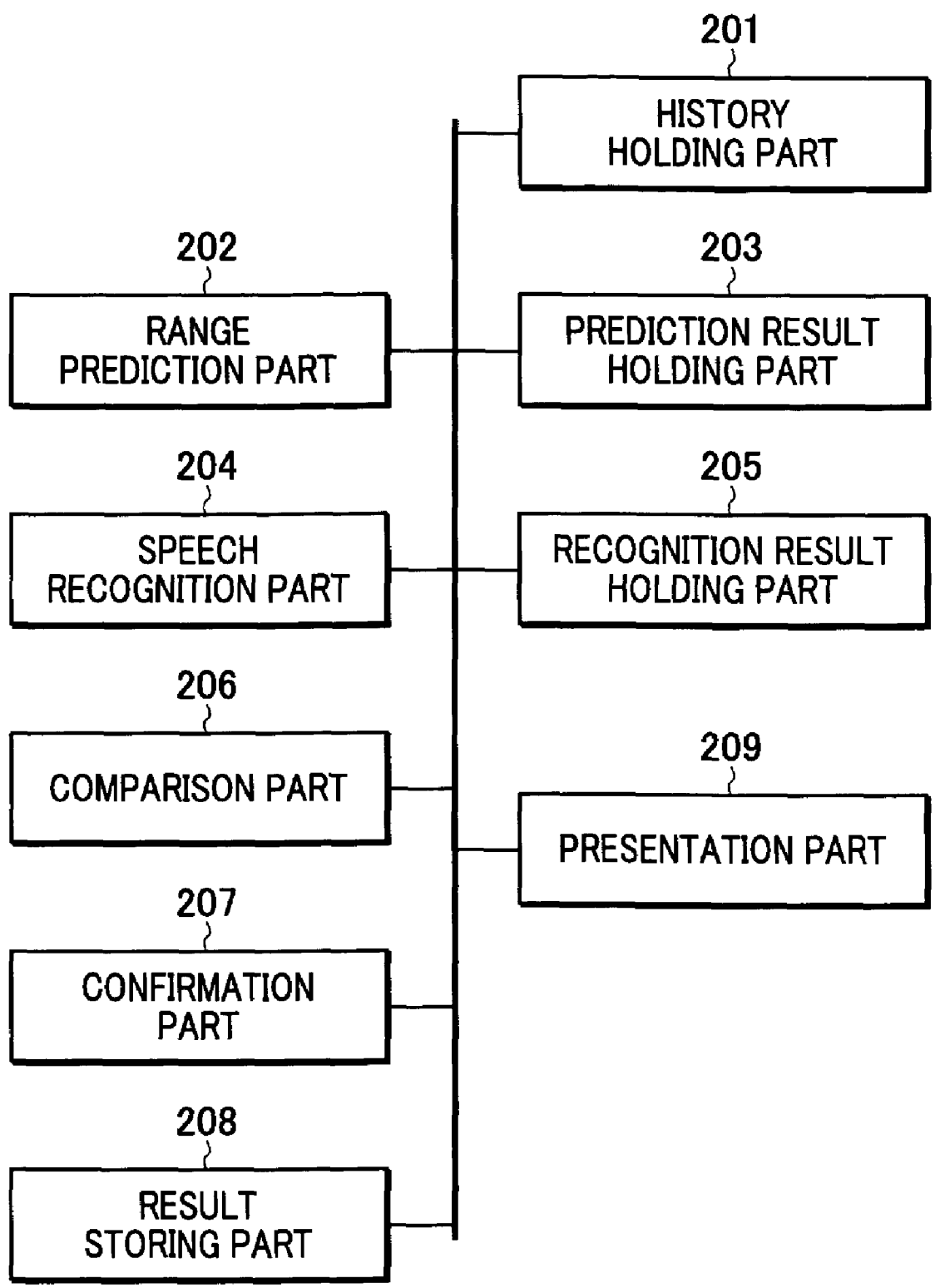
FIG. 2 is a block diagram of the functional structure of a data input device for recognizing input speech and holding a recognition result according to a first embodiment of the present invention.

FIG. 2 is a block diagram of the functional structure of the data input device for recognizing input speech and holding a recognition result according to the first embodiment. A history holding part 201 holds history data of results of meter-reading performed in the past, in other words, data indicating meter readings obtained by meter-reading performed in the past. A range prediction part 202 estimates a meter-reading range (prediction range) expected for a meter reading to be obtained by the future meter-reading, by using the history data held in the history holding part 201. A prediction result holding part 203 stores data indicating the prediction range estimated by the range prediction part 202. A speech recognition part 204 performs speech recognition of speech representing a meter reading (value) and produced by a user (here, a meter reader). Since speech recognition technology is publicly known, description about the technology is omitted here.

A recognition result holding part 205 holds the result of the speech recognition performed by the speech recognition part 204. A comparison part 206 determines whether or not the recognition result is within the prediction range. A confirmation part 207 confirms with the user if the recognition result is correct. A result storing part 208 stores the recognition result as a result of the current meter-reading. A presentation part 209 presents the result of the speech recognition to the user.

Figure 3:
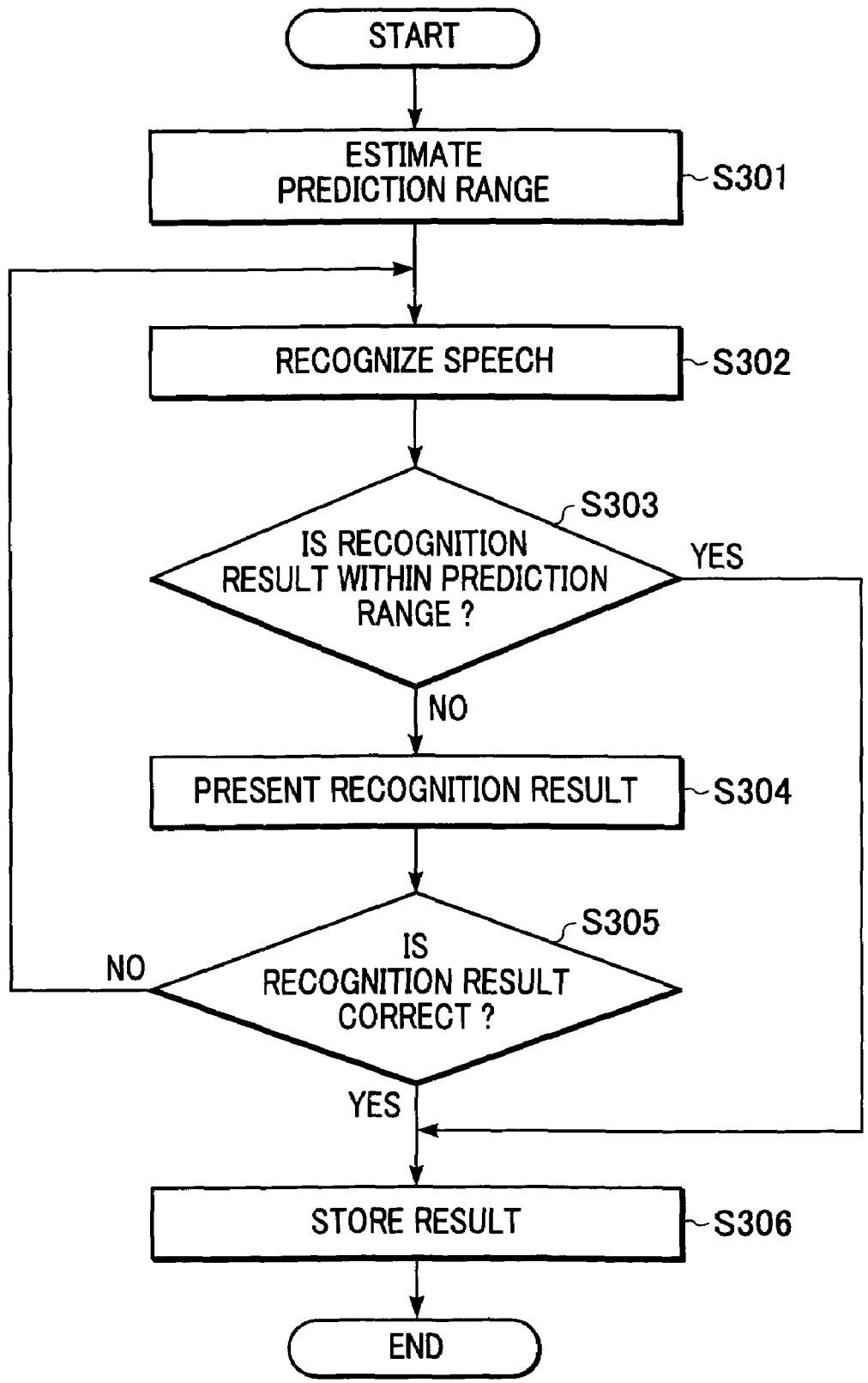
FIG. 3 is a flowchart of a process performed by the data input device according to the first embodiment of the present invention when speech representing a meter reading is input to the data input device.

FIG. 3 is a flowchart of a process performed by the data input device according to the first embodiment of the present invention when speech representing a meter reading is input to the data input device. The process according to the flowchart is performed when the central processing unit 102 detects that speech is input to the microphone 108.

First, the range prediction part 202 estimates (predicts) a range of a value expected to be input, in other words, a possible range (a prediction range) for a meter-reading result (a meter reading) to be obtained by this meter-reading on the basis of data on meter-reading history held in the history holding part 201 (step S301). The data indicating the estimated prediction range is stored in the prediction result holding part 203.

Meter readings obtained by the previous meter-reading, monthly consumption, yearly average consumption, and the like are included an example of meter-reading history. Monthly consumption and yearly average consumption can be calculated from the meter readings obtained in the past. In an example of a method for estimating a prediction range described below, meter readings obtained in the past are used as history.

When a meter reading (Vcurr) for this month to be obtained by this meter-reading is predicted on the basis of the difference between a meter reading (Vm2) obtained by meter-reading performed two months ago and a meter reading (Vm1) obtained by meter-reading performed one month ago, a prediction value for a meter reading for this month is represented by the following equation:

$$Vcurr = Vm1 + (Vm1 - Vm2) = 2Vm1 - Vm2.$$

Since it is obvious that a prediction value may include an error, the prediction value should be regarded as a prediction range. In this case, a prediction range is determined by adding a margin of a certain width (for example, ±50%) to the consumption of the last month (Vm1−Vm2). In this case, the prediction range is represented by the following expressions:

$$2Vm1 - Vm2 - (Vm1 - Vm2)/2 \leq Vcurr \leq 2Vm1 - Vm2 + (Vm1 - Vm2)/2,$$

in other words, $$3/2 Vm1 - 1/2 Vm2 \leq Vcurr \leq 5/2 Vm1 - 3/2 Vm2 \qquad \text{expression (1)}.$$

In accordance with the above calculation, a meter reading for this month, in other words, a value expected to be input can be predicted. Also, since it is assumed that normal consumption (the same frequency as before) should bring about approximately the same value as a normal meter reading, it is possible to determine whether or not a meter reading for this month is approximately the same as a normal value. If the meter reading for this month does not satisfy expression (1), it is determined that the result of speech recognition is wrong (or an input value is wrong) or that the meter reading for this month is abnormal (not within prediction). Thus, the correctness of the input meter reading can be properly checked.

Although a prediction range is estimated by linear prediction in the first embodiment, other statistical procedures may be used.

Referring back to FIG. 3, the speech recognition part 204 performs speech recognition processing for speech that represents a meter reading and that is input through the microphone 108, and stores data indicating the speech recognition result in the recognition result holding part 205 (step S302). The comparison part 206 determines whether or not the meter reading for this month, which is represented by the data stored in the recognition result holding part 205, is within the prediction range (for example, whether or not expression (1) is satisfied) (step S303).

If the meter reading for this month is within the prediction range (for example, if the meter reading for this month satisfies expression (1)), the result of the speech recognition, or data indicating the meter reading obtained by the meter-reading performed this month is stored in the result storing part 208 (step S306). Here, the data indicating the value stored in the result storing part 208 is added to the meter-reading history data stored in the history holding part 201, so that the data is used the next time a prediction range is calculated.

In contrast, if the meter reading for this month is not within the prediction range (for example, if the meter reading for this month does not satisfy expression (1)), the presentation part 209 presents the recognition result to the user (step S304), and the confirmation part 207 urges the user to check the correctness of the recognition result and receives the answer (step S305). The recognition result is presented to the user, so that the user checks whether or not an intended value is input and receives a standard for determining whether or not the meter reading for this month is a normal value, as described above.

More specifically, for example, the recognition result and a message such as "Is this recognition result correct?" may be displayed on the display unit 110. Alternatively, such a message may be output by voice from the speaker 106. Here, character data or voice data of such a message is stored in the external storage unit 104 and thus read by the RAM 103 to be used as necessary.

If the user determines that a meter reading must be input again and inputs such an instruction using the input unit 109 (for example, if a button for inputting again is pressed), the process returns to step S302.

Even if the meter reading for this month is within the prediction range, the recognition result may be presented using the display unit 110 or the speaker 106. In this case, step S303 and step S304 may be performed in reverse order.

As described above, the data input device according to the present invention is capable of checking the correctness of an input value, thus enabling input of a high-precision value.

Second Embodiment

The data input device and the data input method in which the correctness of a recognition result is checked by determining whether or not the speech recognition result is within a prediction range has been described in the first embodiment. In a data input device and a data input method according to a second embodiment, recognition grammar is dynamically generated on the basis of a prediction range and speech recognition is performed using the generated recognition grammar. This allows an object of recognition to be limited, thus improving the recognition rate. As a result of this, more correctness of the recognition result can be achieved.

Figure 4:
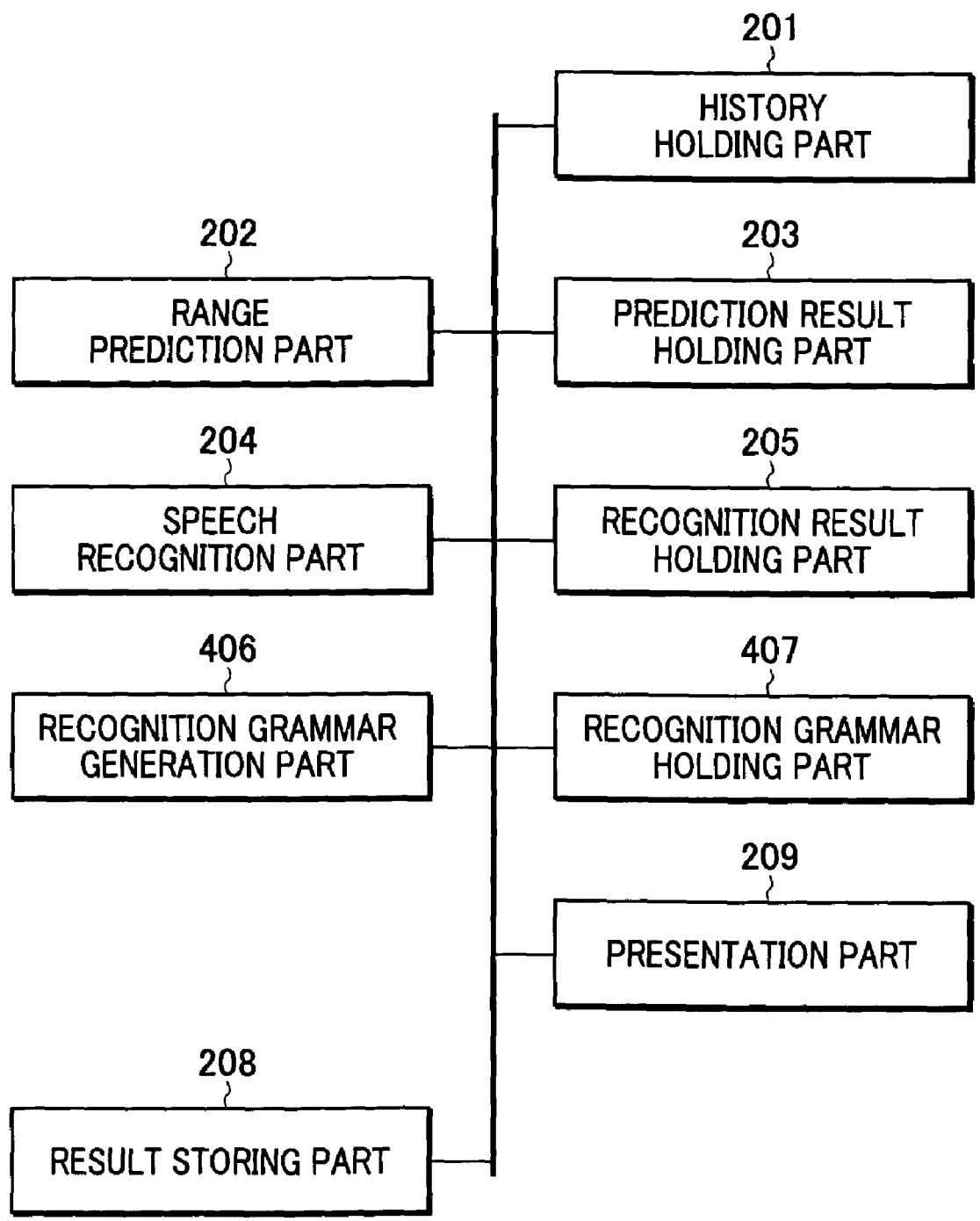
FIG. 4 is a block diagram of the functional structure of a data input device according to a second embodiment of the present invention.

FIG. 4 is a block diagram of the functional structure of the data input device according to the second embodiment. In FIG. 4, the same parts as in FIG. 2 are referred to with the same reference numerals and the descriptions of those same parts will not be repeated here. The data input device according to the second embodiment has a basic structure as in the first embodiment shown in FIG. 1.

The data input device according to the second embodiment includes a recognition grammar generation part 406 and a recognition grammar holding part 407, as shown in FIG. 4, in place of the comparison part 206 and the confirmation part 207 shown in FIG. 2. The recognition grammar generation part 406 generates recognition grammar on the basis of a prediction range held in the prediction result holding part 203. The recognition grammar holding part 407 holds the generated recognition grammar.

Figure 5:
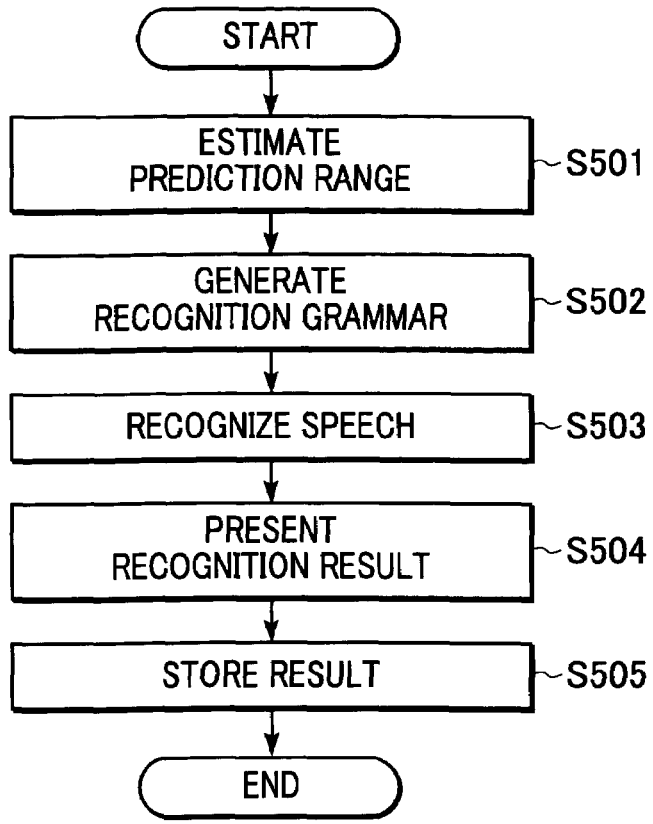
FIG. 5 is a flowchart of a process performed by the data input device according to the second embodiment of the present invention when speech representing a meter reading is input to the data input device.

FIG. 5 is a flowchart of a process performed by the data input device according to the second embodiment when speech representing a meter reading is input to the data input device.

First, the range prediction part 202 estimates (predicts) a range of a value expected to be input, in other words, a possible range (a prediction range) for a meter-reading result (a meter reading) to be obtained by this meter-reading on the basis of data on meter-reading history held in the history holding part 201 (step S501). The data indicating the estimated prediction range is stored in the prediction result holding part 203. The same procedure as in the first embodiment may be used for estimating the prediction range. Alternatively, other procedures may be used.

Figure 6:
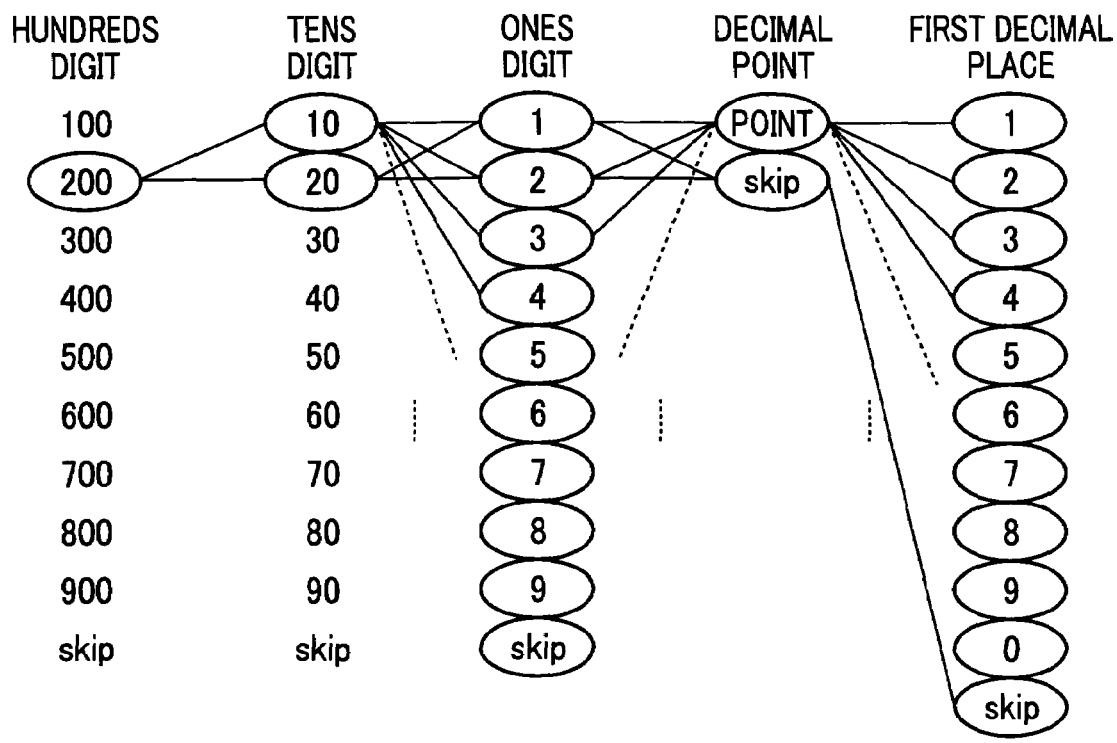
FIG. 6 is an illustration of recognition grammar when a prediction range is represented by expression (2) in the second embodiment.

Next, the recognition grammar generation part 406 generates recognition grammar for recognizing the prediction range on the basis of the prediction range held in the prediction result holding part 203 (step S502). Here, processing for generating recognition grammar based on a prediction range will be described. FIG. 6 is an illustration of recognition grammar when a prediction range is represented as follows:

$$211.3 \leq V\text{curr} \leq 223.5 \qquad \text{expression (2)}.$$

In FIG. 6, values of the hundreds digit, tens digit, ones digit, and the first decimal place, and a decimal point that are necessary for recognizing values from 211.3 to 223.5 are enclosed in circles. Also, each line connecting between the circles represents a possible combination of values. Also, the word "skip" means that the digit or the decimal point provided with "skip" is skipped. Recognition grammar is generated such that the encircled values are regarded as recognizable values in the respective digits. A collection of recognizable words is described in the grammar.

If speech recognition is performed without estimating a range of recognizable values (a prediction range), combinations of any value in any digit are regarded as recognizable values. Since speech recognition compares data of input speech with data of recognizable values and determines the most probable data from the recognizable values as a recognition result, more processing time is needed in accordance with an increase of the number of recognizable values. The processing performed in the second embodiment allows recognizable values to be limited, thus achieving a higher-speed processing and a higher-precision recognition result. Although, in order to simplify the explanation, recognition grammar is generated on the assumption that scaled values are read, as shown in FIG. 6, recognition grammar is not limited to this. Values in each digit may be sequentially read or reading scaled values and sequentially reading values in each digit may be combined.

Referring now back to FIG. 5, the speech recognition part 204 performs speech recognition on the basis of the recognition grammar generated by step S502 (step S503), the presentation part 209 presents the recognition result to the user (step S504), and the recognition result is stored in the result storing part 208 (step S505).

Third Embodiment

A case where a speech recognition result is presented to a user only when the speech recognition result is not within a prediction range has been described in the first embodiment. However, current technology for speech recognition cannot always have 100% accurate results. Thus, normally, speech recognition results are always presented to users. A case where the details presented to a user are changed depending on whether or not the speech recognition result is within a prediction range will now be described in a third embodiment.

Although a data input device according to the third embodiment has a functional structure as in the first embodiment shown in FIG. 2, some parts perform different processing. Also, the data input device according to the third embodiment has a basic structure as in the first embodiment shown in FIG. 1. The presentation part 209 presents to a user a different recognition result and information for urging the user to check the result depending on whether or not the recognition result is within a prediction range.

Figure 7:
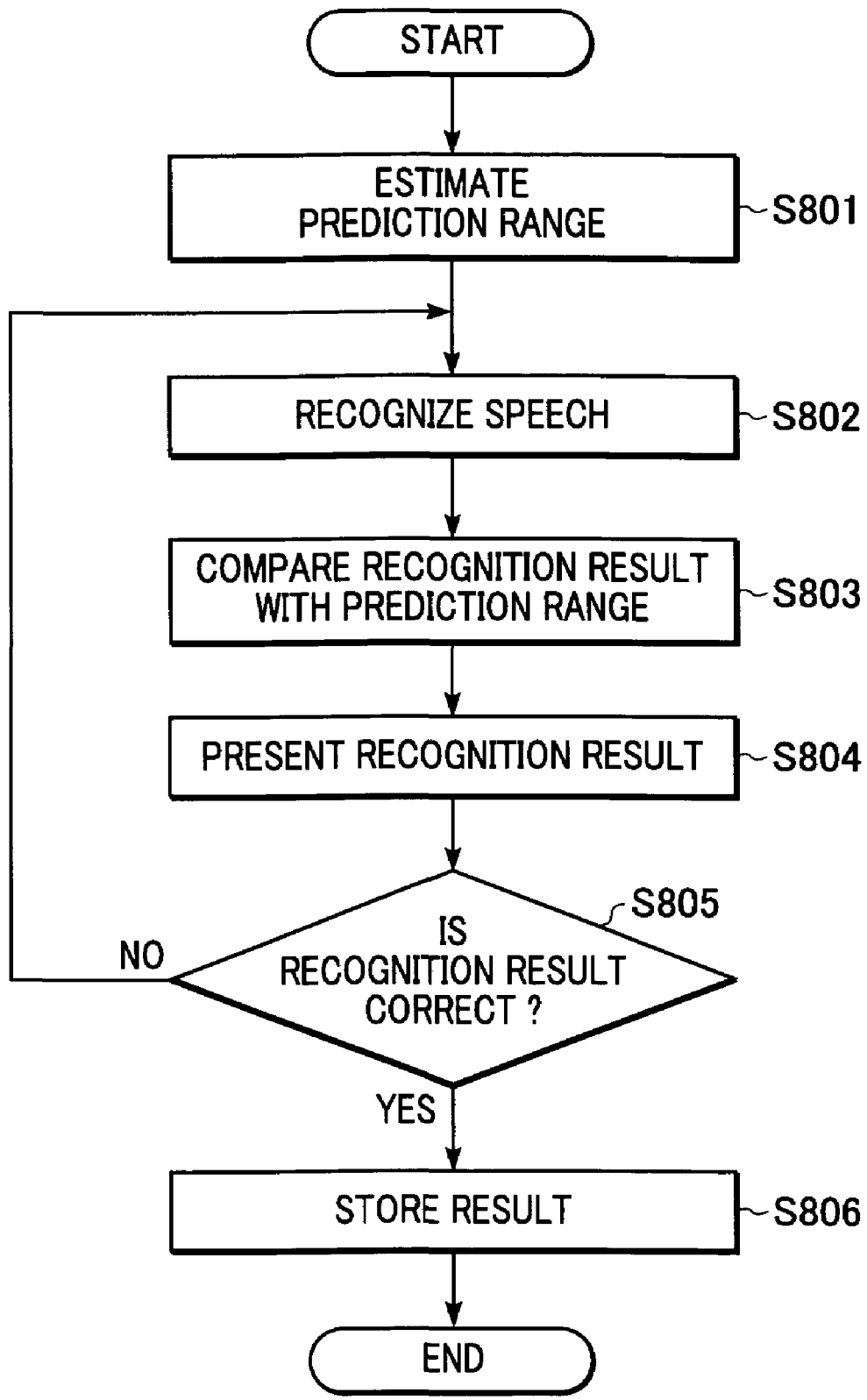
FIG. 7 is a flowchart of a process performed by a data input device according to a third embodiment of the present invention when speech representing a meter reading is input to the data input device.

FIG. 7 is a flowchart of a process performed by the data input device according to the third embodiment when speech representing a meter reading is input to the data input device.

Since step S801 and step S802 are the same as step S301 and step S302 in the first embodiment, respectively, explanations for steps S801 and S802 are omitted here.

In step S803, the comparison part 206 determines whether or not a meter reading for this month represented by data stored in the recognition result holding part 205 is within a prediction range. Then, the process proceeds to step S804.

In step S804, the presentation part 209 generates presentation details for presenting the recognition result to the user depending on a comparison result (whether or not the recognition result is within the prediction range) obtained by the comparison part 206, and presents the recognition result and information corresponding to the comparison result through the display unit 110 or the speaker 106. Then, the process proceeds to step S805.

Since step S805 and step S806 are the same as step S305 and step S306 in the first embodiment, respectively, explanations for steps S805 and S806 are omitted here.

Figure 8A:
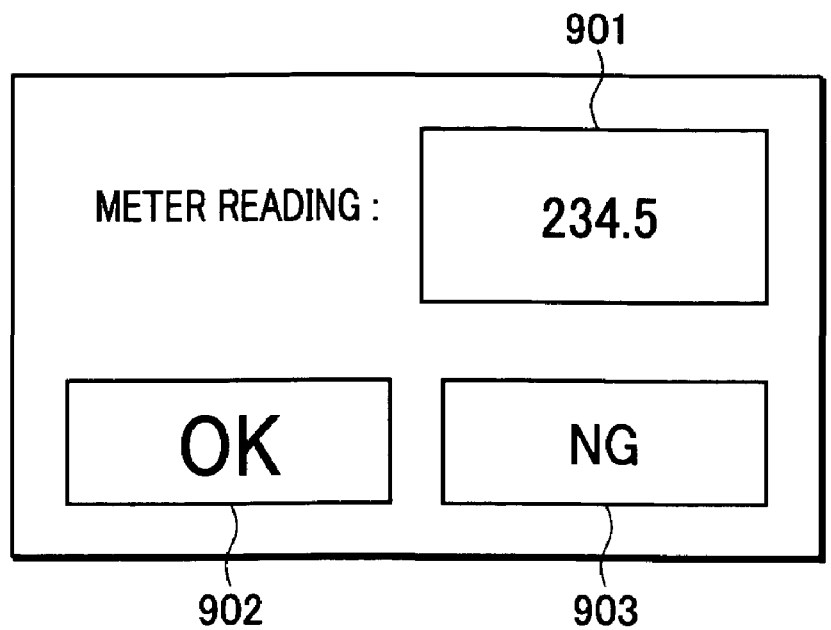
FIG. 8A is an illustration of an example of information presented by a presentation part in the third embodiment.
Figure 8B:
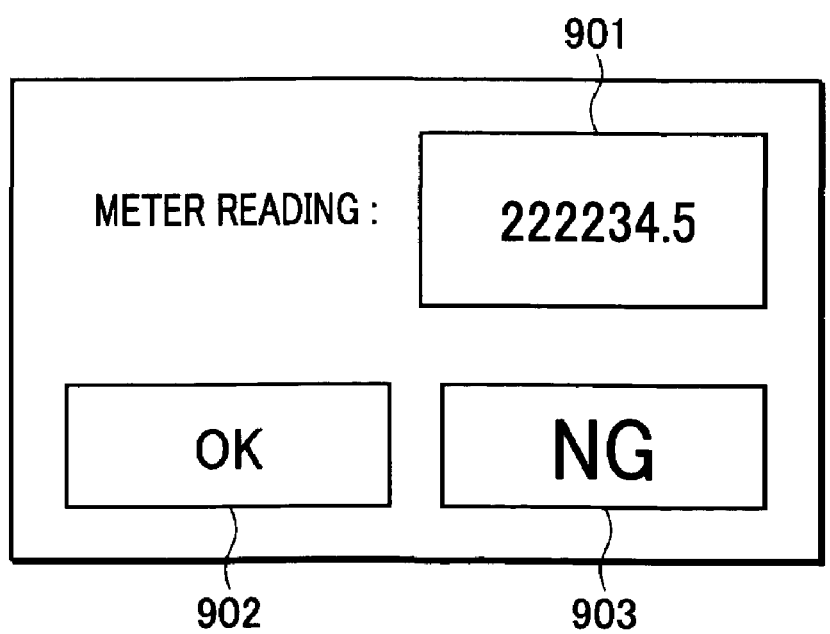
FIG. 8B is an illustration of another example of information presented by the presentation part in the third embodiment.

FIGS. 8A and 8B are illustrations of examples of information to be presented by the presentation part 209 in accordance with the comparison result obtained by the comparison part 206. The information is presented in a graphical user interface (GUI) format. FIG. 8A is an illustration of a GUI output on the display unit 110 when the recognition result is within the prediction range. A recognition result display area 901 and buttons 902 and 903 for inputting the determinations of correctness and incorrectness, respectively, of the recognition result by the user are displayed on the display unit 110. Since the recognition result is more likely to be correct in this case, the word "OK" is displayed in a bold and large font to attract attention.

FIG. 8B is an illustration of a GUI output on the display unit 110 when the recognition result is not within the prediction range. Since the recognition result is more likely to be wrong or an abnormal value in this case, the word "NG" is displayed so as to attract attention. Changing the details to be presented depending on whether or not the recognition result is within a prediction range, as described above, effectively prevents wrong input. In addition to changing the font and size of characters, colors may be changed or a sound or an image for alerting a user that the recognition result is not within the prediction range may be presented.

Pressing the "OK" button causes the process to proceed from step S805 to step S806. Pressing the "NG" button causes the process to returns from step S805 to step S802.

Fourth Embodiment

Although the correctness of a recognition result is determined on the basis of meter-reading history of the past two months in the data input device and the data input method according to the first embodiment, the correctness of a recognition result may be determined only on the basis of meter-reading history of the last month.

Gas and electricity meters exhibit values cumulatively increasing in accordance with an amount consumed. In other words, a meter reading for this month is at least more than or equal to that of the last month. From this characteristic, any recognition result of a month less than that of the last month is determined to be wrong.

In a data input device according to a fourth embodiment, the range prediction part 202 and the prediction result holding part 203 shown in FIG. 2 can be omitted, and history of the last month, that is, data indicating a meter reading obtained by meter-reading performed in the last month is stored in the history holding part 201. The comparison part 206 compares a speech recognition result with the data indicating the meter reading for the last month held in the history holding part 201. If the meter reading of the recognition result is less than the meter reading for the last month, the confirmation part 207 confirms with the user if the recognition result is correct, as in the first embodiment. Here, an object to be compared may be a meter reading obtained by meter-reading performed two or more months ago.

Fifth Embodiment

It is also possible that recognition grammar is dynamically generated as in the second embodiment by using the relationship between a meter reading for this month and a meter reading for the last month, as described in the fourth embodiment. In a data input device according to a fifth embodiment, the range prediction part 202 and the prediction result holding part 203 shown in FIG. 4 can be omitted, and history of the last month, that is, data indicating a meter reading obtained by meter-reading performed in the last month is stored in the history holding part 201. The recognition grammar generation part 406 generates recognition grammar such that values more than or equal to the meter reading for the last month held in the history holding part 201 are recognizable.

Sixth Embodiment

Although meter readings of the past two months are used to estimate a prediction range in the data input device and the data input method according to the first embodiment, the present invention is not limited to this. A prediction range may be estimated, for example, on the basis of consumption in the same month of the last year. In particular, since consumption of gas and electricity varies with seasons, more accurate prediction can be achieved by this procedure.

Seventh Embodiment

Although a prediction range is determined by adding a margin of a certain width, such as ±50%, to the consumption of the last month (Vm1−Vm2) in the first embodiment, the present invention is not limited to this. The width of a prediction range may be determined on the basis of statistics on the average and dispersion of monthly consumption of the previous months.

Eighth Embodiment

Although a possible range of a meter reading is represented by values of three digits and one decimal place in the description of generating recognition grammar according to the second embodiment, the number of digits is not limited to this.

Ninth Embodiment

Although the confirmation part 207 presents a recognition result to a user when the recognition result is not within the prediction range in the data input device and the data input method according to the first embodiment, such presentation processing may be omitted. When the recognition result is determined not to be within a prediction range, a user may be urged through the display unit 110 or the speaker 106 to input speech again so that speech recognition processing is performed again.

Tenth Embodiment

Although voice is used as means for inputting a value again when a recognition result is not within a prediction range in the data input device and the data input method according to the first embodiment, the input unit 109, that is, a pen or a numerical keypad may be used in such a case. This procedure is preferable when it is difficult or desired to be avoided to repeat such speech many times.

Eleventh Embodiment

Although the functional structure shown in FIG. 2 or FIG. 4 is provided in the data input device according to the embodiments described above, the present invention is not limited to this. Each part may be formed of a computing machine and spread out on a network in order to perform data communication with each other.

Other Embodiments

The present invention is not necessarily limited to a device and method for realizing the embodiments described above. The present invention is also applicable to a case where the embodiments described above can be realized by supplying program codes of software for realizing the embodiments described above to a computer (a CPU or an MPU) of the system or the device and by causing the computer of the system or the device to operate each part in accordance with the program codes.

In this case, the program codes themselves of the software realize functions of the embodiments described above. Thus, the program codes themselves and means for supplying the program codes to the computer, more specifically, a recording medium storing the program codes are also included in the scope of the present invention.

For example, a floppy (registered trademark) disc, a hard disc, an optical disc, a magnetic optical disc, a CDROM, a magnetic tape, a nonvolatile memory card, a ROM, and the like may be used as recording media for storing such program codes.

Also, such program codes are also included in the scope of the present invention, not only in a case where the functions of the embodiments described above can be realized by controlling each part by the computer in accordance only with the supplied program codes, but also in a case where the embodiments described above can be realized by the program codes in cooperation with an operating system (OS), an application program, or the like running on the computer.

A case where the embodiments described above can be realized by performing part or all of the actual processing by a CPU or the like arranged in a function extension board of the computer or a function extension unit connected to the computer on the basis of instructions of supplied program codes after the program codes are stored in a memory of the function extension board or the function extension unit is also included in the scope of the present invention.

As described above, according to the present invention, a high-precision value can be input.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data input device for inputting numeric data by voice, the data input device comprising:
    a holder operable to hold numeric data input in the past;
    a speech recognizer operable to perform speech recognition of input speech representing a value;
    a determiner operable to determine whether or not a value represented by a recognition result obtained by the speech recognizer is larger than or equal to the values input in the past; and
    a presenter operable to present details corresponding to the determined result,
    wherein when the value represented by the recognition result obtained by the speech recognizer is smaller than the newest value in the stored order in the holder, the determiner determines the value represented by the recognition result not to be numeric data to be input.

2. A data input device according to claim 1, wherein the data input device is a portable terminal.

3. A data input method performed by a data input device that comprises a memory for holding numeric data input in the past and that inputs numeric data by voice, the data input method comprising:
    a speech recognition step of performing speech recognition of input speech representing a value;
    a determination step of determining whether or not a value represented by a recognition result obtained by the speech recognition step is larger than or equal to the values input in the past; and
    a presentation step of presenting details corresponding to the determined result,
    wherein when the value represented by the recognition result obtained in the speech recognition step is smaller than the newest value in the stored order in the holder, the determination step determines the value represented by the recognition result not to be numeric data to be input.

4. A program for causing a computer to function as the data input device as set forth in claim 1.

5. A program for causing a computer to perform the data input method as set forth in claim 3.

6. A computer-readable recording medium storing the program as set forth in claim 4.

7. A computer-readable recording medium storing the program as set forth in claim 5.

* * * * *